3,079,381
6,19-AMINO ANDROSTANES
Albert Bowers, Mexico City, Mexico, assignor, by mesne assignments, to Syntex Corporation, a corporation of Panama
No Drawing. Filed Nov. 10, 1960, Ser. No. 68,378
20 Claims. (Cl. 260—239.5)

The present invention relates to novel cyclopentanophenanthrene compounds and to a process for the preparation thereof.

More particularly the present invention relates to C-6, 19-amine derivatives of the androstane series and more specifically to C-6,19-amine derivatives of androstane-3β, 17β-diol and of 17α-lower alkyl-androstane-3β-17β-diol and to esters thereof with hydrocarbon carboxylic acids of less than 12 carbon atoms.

The novel compounds of the present invention which exhibit high anabolic activity with low androgenicity and which are hypotensive agents in additions to having fungistatic properties and lowering the cholesterol level are represented by the following formula:

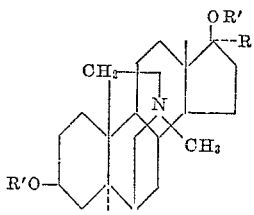

In the above formula R represents hydrogen or a lower alkyl group and R' represents hydrogen or the acyl group of a hydrocarbon carboxylic acid of less than 12 carbon atoms which may be saturated, unsaturated, of straight, branched, cyclic or cyclic-aliphatic chain, aromatic and may be substituted by functional groups such as hydroxyl, alkoxy of up to 5 carbon atoms, acyloxy of up to 8 carbon atoms, amino, nitro or halogen. Typical ester groups are the acetate, propionate, butyrate, enanthate, benzoate, trimethylacetate, t-butylacetate, phenoxyacetate, cyclopentylpropionate, aminoacetate and β-chloropropionate.

The novel compounds of the present invention may be prepared by a process illustrated by the following equation:

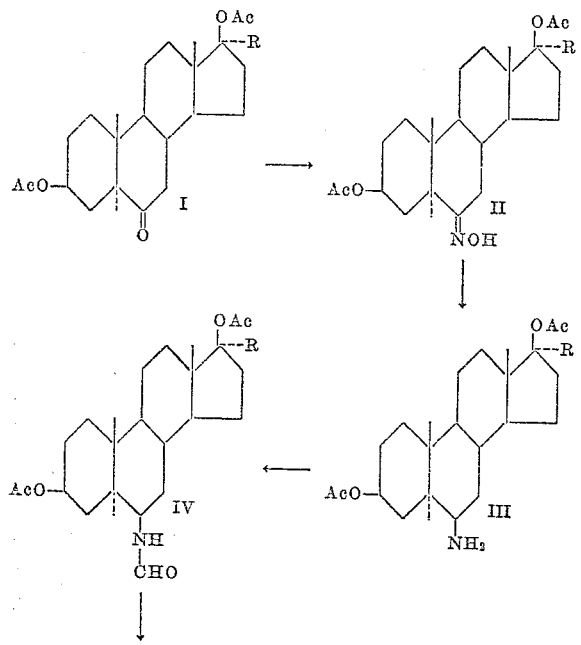

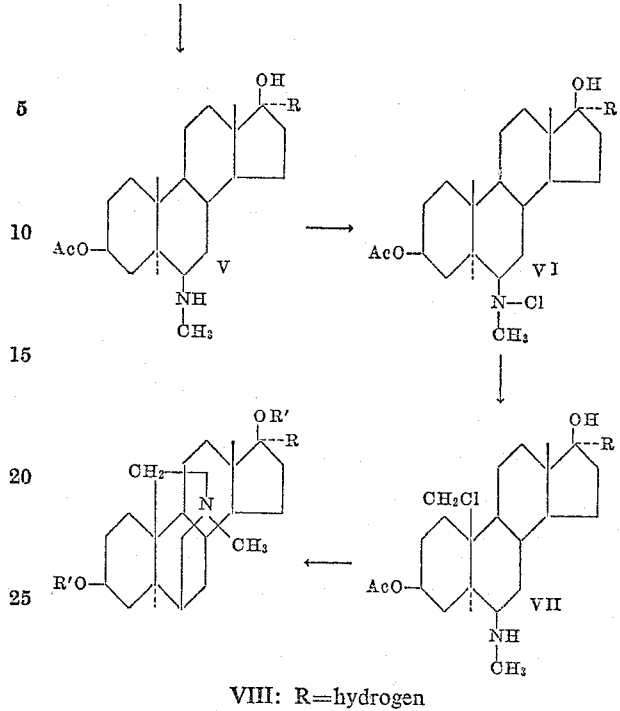

VIII: R=hydrogen
VIIIa: R=lower alkyl

In the above equation R and R' have the same meaning as previously set forth; Ac represents the acetyl radical but other acyl radicals of hydrocarbon carboxylic acids of less than 12 carbon atoms of the type previously mentioned may be employed.

In practicing the process outlined above, the starting compound, androstane-3β,17β-diol-6-one diacetate (I) or the 17α-lower alkyl derivative thereof is prepared by reacting Δ5-androstene-3β,17β-diol diacetate or 17α-lower alkyl-Δ5-androstene-3β,17β-diol diacetate in dioxane solution containing a catalytic amount of perchloric acid with N-bromoacetamide to form 5α-bromo-androstane-3β,6β, 17β-triol-3,17-diacetate or the 17α-lower alkyl derivative thereof, which upon oxidation with chromatic acid in acetone solution is converted into the corresponding 6-keto derivative. Reductive debromination of the latter derivative as by treatment with zinc and acetic acid affords the diacetate of androstane-3β,17β-diol-6-one or of 17α-lower alkyl-androstane-3β,17β-diol-6-one (I).

Upon refluxing the latter ketone with hydroxylamine in pyridine solution, there is formed the C-6 oxime (II) which upon hydrogenation in the presence of a platinum oxide catalyst is converted into the 6-amino derivative (III). The latter is then reacted with ethyl formate under anhydrous conditions to afford the C-6 formamide (IV) which upon reduction with lithium aluminum hydride affords the free C-6-N-methylamino-3β-ol compound. Preferential esterification of the 3-hydroxy group is effected with acetic anhydride in pyridine and there is thus formed the 3β-acetoxy-C-6-N-methylamino compound (V) which upon subsequent treatment with N-chlorosuccinimide is converted into the C-6-N-chloro-N-methylamine (VI). Upon subjecting a sulfuric acid solution of the latter compound to ultra-violet light, there is formed the 19-chloro-6-N-methylamino compound (VII) which is treated with dilute methanolic potassium hydroxide solution for a period of time in the order of 60 hours to form the novel C-6,19-amino-androstane-3β,17β-diol (VIII: R'=hydrogen) or the 17α-alkyl derivative (VIIIa: R'=hydrogen). Upon conventional esterification with a hydrocarbon carboxylic acid anhydride of less than 12 carbon atoms, there is formed the 3β-monoesters of VIII and VIIIa and also the 3β,17β-diesters of VIII. Esterification of a tertiary hydroxyl group at C-17β is effected by reaction with a hydrocarbon carboxylic acid anhydride in benzene solution in the presence of p-toluenesulfonic acid.

The following examples serve to illustrate but are not intended to limit the scope of the invention:

Example I

A suspension of 10 g. of the diacetate of Δ5-androstene-3β,17β-diol in 100 cc. of dioxane was treated with 12 cc. of 0.46 N perchloric acid and then with 4 g. of N-bromoacetamide; the N-bromoacetamide was added little by little, with stirring, in the course of one hour, in the dark and maintaining the temperature around 15°. The mixture was stirred for 1 hour further in the dark at room temperature; it was then decolorized by the addition of 10% aqueous sodium bisulfite solution, 1 liter of water was added and the product was extracted with methylene chloride; the extract was washed with water, dried over anhydrous sodium sulfate and the solvent was evaporated under reduced pressure at room temperature. The residue was crystallized from acetone-hexane to afford 3,17-diacetate of 5α-bromo-androstane-3β,6β,17β-triol; M.P. 172–174°; [α]$_D$ —44°; yield 77%.

There was prepared 100 cc. of an 8 N solution of chromic acid from 26.7 g. of chromium trioxide, 23 cc. of concentrated sulfuric acid and distilled water. A solution of 10 g. of the 3,17-diacetate of 5α-bromo-androstane-3β,6β,17β-triol in 100 cc. of acetone was cooled to 0° C. and treated with the 8 N solution of chromic acid until the characteristic color of chromium trioxide persisted in the mixture. The 8 N solution of chromic acid was added in a slow stream, under an atmosphere of nitrogen, with stirring and at 0° C. The mixture was then stirred at 0° C. under an atmosphere of nitrogen for 2 minutes further, poured into ice water and the precipitate was collected by filtration, washed with water and dried under vacuum, thus affording the diacetate of 5α-bromo-androstane - 3β,17β - diol-6-one. A sample crystallized from acetone-hexane had M.P. 188–191°; [α]$_D$ —168°.

A mixture of the above compound, 10 g. of zinc dust and 250 cc. of glacial acetic acid was refluxed for 2 hours, at the end of which it was filtered through celite under an atmosphere of nitrogen and the filtrate was concentrated to a small volume under reduced pressure; after cooling it was diluted with ice water and the precipitate of the diacetate of androstane-3β,17β-diol-6-one was collected by filtration, washed with water and dried.

Example II

By substituting in the procedure of Example I the diacetate of Δ5-androstene-3β,17β-diol by the diacetate of 17α-ethyl-Δ5-androstene-3β,17β-diol, there was produced the diacetate of 17α-ethyl-androstane-3β,17β-diol-6-one.

Example III

A solution of 15 g. of androstane-3β,17β-diol-6-one diacetate in 45 cc. of anhydrous pyridine was treated with 15 g. of hydroxylamine hydrochloride previously dissolved in 90 cc. of water. The mixture was refluxed for 18 hours; it was then poured into ice water, the formed precipitate was collected by filtration, washed with water and dried. Recrystallization from methanol afforded the oxime of 3β,17β-diacetoxy-androstan-6-one; M.P. 253–255° C. (9.2 g.) and a second crop, M.P. 245–248° C. (2.9 g.).

Example IV

A solution of 13.3 g. of the above oxime in 200 cc. of acetic acid was hydrogenated under pressure (50 pounds) overnight using 1.9 g. of platinum oxide as a catalyst. After filtration of the catalyst, the solvent was evaporated to dryness under vacuum and the residue triturated with saturated sodium bicarbonate solution, filtered and washed with water to neutral, thus yielding 6.5 g. of 6β-amino-3β,17β-diacetoxy-androstane.

Example V 5.7 g. of 6-amino-3β,17β-diacetoxy-androstane was refluxed under anhydrous conditions with 120 cc. of anhydrous ethyl formate, evaporated to dryness under vacuum and the residue crystallized from acetone-hexane to afford 3β,17β - diacetoxy - androstane-6β-N-formylamine; M.P. 235–238° C.;[α]$_D$ —62(CHCl$_3$).

Example VI

A solution of 4 g. of the above compound in 120 cc. of anhydrous tetrahydrofuran was added dropwise to a suspension of 4 g. of lithium aluminum hydride in 200 cc. of anhydrous tetrahydrofuran and the mixture was refluxed for 1 hour with stirring. Acetone was added cautiously to decompose the excess of hydride, then saturated aqueous sodium sulfate solution and finally solid anhydrous sodium sulfate were added. The solid was filtered and washed well with hot ethyl acetate, and the filtrate and washings were evaporated to dryness under reduced pressure. The residue was dissolved in 15 cc. of pyridine and 1.1 equivalents (1 cc.) of acetic anhydride, kept at 10° for 16 hours, poured into water, heated for an additional half an hour, and the formed precipitate collected by filtration. Crystallization from acetone-hexane gave the 6β - N-methylamino-androstane-3β,17β-diol-3-acetate compound.

Example VII

A stirred solution of 1 g. of the above methylamino compound in 500 cc. of methylene chloride was treated with 1 g. of N-chlorosuccinimide and the mixture was stirred for 15 minutes further. The solution was then washed with water, dried and evaporated to dryness at low temperature. Recrystallization from acetone gave 6β-N-chloro - N-methylamino-androstane-3β,17β-diol-3-acetate plus recovered starting material.

Example VIII

A solution of 1 g. of the chloromethylamino compound (Example VII) in 15 cc. of 90% sulfuric acid was irradiated for 24 hours with a sun lamp; water was added and the resulting precipitate filtered to afford 6β-N-methylamino-19-chloro-methyl-androstane-3β,17β-diol 3-acetate.

Example IX 500 mg. of the final product produced in Example VIII were dissolved in 10 cc. of 1% methanolic potassium hydroxide and the mixture was kept at room temperature for 60 hours. After dilution with water and filtration of the product, there were obtained 380 mg. of 6,19-N-methylamino-androstane-3β,17β-diol.

Example X

By applying the procedure described in Examples III through IX to the diacetate of 17α-ethyl-androstane-3β,17β-diol-6-one prepared in Example II, there were produced all of the compounds described in such examples having an ethyl group at C-17α.

Example XI

A mixture of 500 mg. of 6,19-N-methylamino-androstane-3β,17β-diol, 5 cc. of pyridine and 5 cc. of acetic anhydride was kept at room temperature overnight, poured into ice water and the solid collected by filtration, washed with water and dried. There was thus obtained 6,19-N-methylamino-androstane-3β,17β-diol diacetate.

Example XII

By following the method of the preceding example, but using propionic, caproic and cyclopentylpropionic anhydride as esterifying agents, there were obtained the dipropionate, dicaproate and dicyclopentylpropionate of 6,19-N-methylamino-androstane-3β,17β-diol.

Example XIII

Examples XI and XII were repeated, but using 17α-ethyl-6,19 - N-methylamino-androstane - 3β,17β-diol as starting material, there were thus produced 17α-ethyl-6,19-N-methylamino-androstane-3β,17β-diol 3-acetate and the corresponding 3-propionate, 3-caproate and 3-cyclopentylpropionate.

Example XIV

A solution of 200 mg. of 17α-ethyl-6,19-N-methylamino-androstan-3β,17β-diol 3-acetate in 12 cc. of benzene was treated with 0.5 cc. of propionic anhydride and 100 mg. of p-toluenesulfonic acid; the mixture was kept at room temperature for 48 hours, washed well with water, sodium carbonate solution and water to neutral, dried over anhydrous sulfate and evaporated to dryness. Crystallization from acetone-hexane gave the 3-acetate, 17-propionate of 17α-ethyl-6,19-N-methylamino-androstan-3β,17β-diol.

Example XV

By applying the method of the preceding example, but using acetic anhydride instead of propionic anhydride, 17α-ethyl-6,19-N - methylamino-androstane - 3β,17β-diol 3-acetate and the corresponding 3-caproate were converted respectively into 17α-ethyl-6,19-N-methylamino-androstan - 3β,17β-diol - diacetate and 17α-ethyl-6,19-N-methylamino - androstane-3β,17β-diol-3-caproate 17-acetate.

I claim:

1. A compound of the following formula:

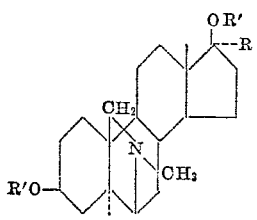

wherein R is selected from the group consisting of hydrogen and lower alkyl and R' is selected from the group consisting of hydrogen and a hydrocarbon carboxylic acyl group of less than 12 carbon atoms.

2. 6β,19-N-methylamino-androstane-3-β,17β-diol.
3. 6β,19-N-methylamino-17α-ethyl - androstane-3β,17β-diol.
4. The hydrocarbon carboxylic acid diesters of less than 12 carbon atoms of 6β,19-N-methylamino-androstane-3β,17β-diol.
5. 6β,19-N-methylamino-androstane-3β,17β-diol diacetate.
6. 6β,19-N-methylamino - androstane - 3β,17β-diol dipropionate.
7. The C-3 hydrocarbon carboxylic acid esters of less than 12 carbon atoms of 6β,19-N-methylamino-17α-lower alkyl androstane-3β,17β-diol.
8. The hydrocarbon carboxylic acid diesters of less than 12 carbon atoms of 6β,19-N-methylamino-17α-lower alkyl-androstane-3β,17β-diol.
9. 17α-ethyl-6β,19 - N-methylamino - androstane - 3β,17β-diol 3-acetate.
10. 17α-ethyl-6β,19 - N-methylamino-androstane - 3β,17β-diol-3-caproate.
11. 17α-ethyl-6β,19-N-methylamino - androstane - 3β,17β-diol-3-acetate-17-propionate.
12. 17α-ethyl-6β,19-N-methylamino - androstane - 3β,17β-diol-diacetate.
13. 17α-ethyl-6β,19-N-methylamino - androstane - 3β,17β-diol-3-caproate-17-acetate.
14. The hydrocarbon carboxylic acid esters of less than 12 carbon atoms of 6β-N-formylamino-androstane-3β,17β-diol.
15. 6β-N-formylamino - androstane-3β,17β-diol diacetate.
16. The C-3 hydrocarbon carboxylic acid esters of less than 12 carbon atoms of 6β-N-methylamino-androstane-3β,17β-diol.
17. 6β-N-methylamino-androstane - 3β,17β-diol 3-acetate.
18. The C-3 hydrocarbon carboxylic acid esters of less than 12 carbon atoms of 6β-N-chloro-N-methylamino-androstane-3β,17β-diol.
19. 6β-N-chloro - N-methylamino-androstane - 3β,17β-diol 3-acetate.
20. In the process of producing a 6β,19-N-methylamino-androstane-3β,17β-diol the steps comprising reacting a 6-amino androstane - 3β,17β - diacylate with ethyl formate, reducing the thus formed C-6 formamide with lithium aluminum hydride to form 6-N-methylamino-androstane-3β,17β-diol, esterifying the latter compound and thereafter treating with a chlorinating agent N-chlorosuccinimide and then irradiating the thus formed 6β-N - chloro - N - methylamino - androstane derivative with ultra-violet light.

No references cited.

UNITED STATES PATENT OFFICE
CERTIFICATE OF CORRECTION

Patent No. 3,079,381                      February 26, 1963

Albert Bowers

It is hereby certified that error appears in the above numbered patent requiring correction and that the said Letters Patent should read as corrected below.

Column 1, lines 23 to 31, the formula should appear as shown below instead of as in the patent:

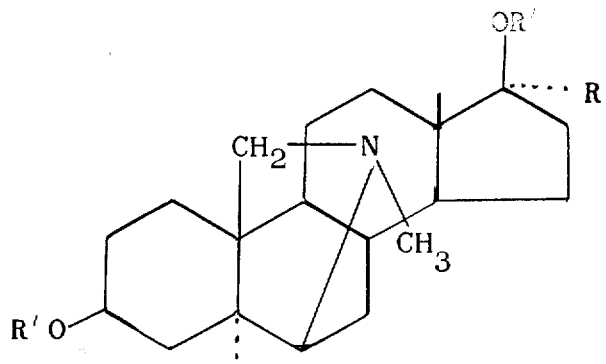

column 2, lines 16 to 30, the left-hand side formula should appear as shown below instead of as in the patent:

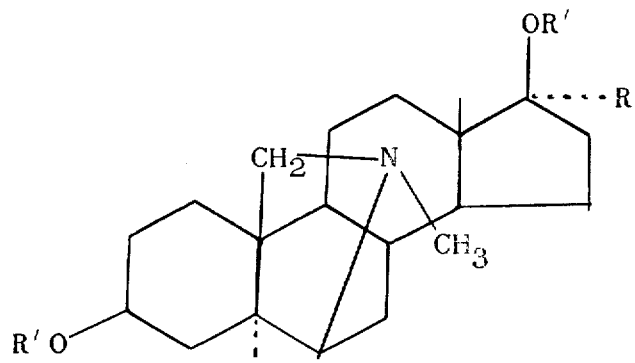

VIII : R=hydrogen
VIIIa: R=lower alkyl

Signed and sealed this 22nd day of October 1963.

(SEAL)
Attest:
ERNEST W. SWIDER
Attesting Officer

EDWIN L. REYNOLDS
Acting Commissioner of
Patents